United States Patent
Hanko

(10) Patent No.: US 7,215,345 B1
(45) Date of Patent: May 8, 2007

(54) METHOD AND APPARATUS FOR CLIPPING VIDEO INFORMATION BEFORE SCALING

(75) Inventor: James G. Hanko, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/289,785

(22) Filed: Apr. 9, 1999

(51) Int. Cl.
  *G06T 3/00* (2006.01)
(52) U.S. Cl. ...................................... 345/620; 345/628
(58) Field of Classification Search ................ 345/434, 345/344, 433, 340, 435, 24, 16, 620, 719, 345/590, 720, 619, 721, 629, 722, 621, 723, 345/622, 724, 623, 725, 624, 726, 625, 628; 348/14.01–14.13, 739, 565; 248/917–924, 248/91–94, 114–116; 725/1, 12, 20, 117, 725/41; 704/500–504; 382/232–253, 70; 370/477; 375/240.01–240.29
See application file for complete search history.

(56) References Cited

U.S. PATENT DOCUMENTS

| | | | | |
|---|---|---|---|---|
| 4,623,880 A | * | 11/1986 | Bresenham et al. | 345/24 |
| 5,012,433 A | * | 4/1991 | Callahan et al. | 345/434 |
| 5,369,741 A | * | 11/1994 | Hartog et al. | 345/443 |
| 5,455,897 A | * | 10/1995 | Nicholl et al. | 345/434 |
| 5,515,511 A | * | 5/1996 | Nguyen et al. | 725/117 |
| 5,522,020 A | * | 5/1996 | Narayanaswami | 345/433 |
| 5,553,210 A | * | 9/1996 | Narayanaswami | 345/434 |
| 5,594,848 A | * | 1/1997 | Dao | 345/434 |
| 5,644,714 A | * | 7/1997 | Kikinis | 709/219 |
| 5,699,277 A | * | 12/1997 | Munson et al. | 345/725 |
| 5,822,524 A | * | 10/1998 | Chen et al. | 709/203 |
| 5,854,887 A | * | 12/1998 | Kindell et al. | 725/86 |
| 5,987,501 A | * | 11/1999 | Hamilton et al. | 709/203 |
| 6,029,195 A | * | 2/2000 | Herz | 725/116 |
| 2001/0032254 A1 | * | 10/2001 | Hawkins | 709/219 |
| 2004/0080504 A1 | * | 4/2004 | Salesky et al. | 345/418 |

* cited by examiner

*Primary Examiner*—Jeffery A. Brier
(74) *Attorney, Agent, or Firm*—Martine Penilla & Gencarella, LLP

(57) ABSTRACT

A method and apparatus for clipping video information before scaling. In an embodiment of the invention, a transmitter obtains video information in the form of image data, as well as clipping information defining one or more display regions in which the image data is to be displayed. In accordance with the clipping information, the transmitter performs clipping operations on the image data, and transmits the clipped image data to a receiver. Prior to displaying the clipped image data, the receiver performs any needed scaling of the clipped image data to conform to the dimensions of the display regions. By performing clipping operations prior to transmission, and scaling operations subsequent to transmission, unnecessary image data is omitted and greater transmission efficiency is achieved.

38 Claims, 9 Drawing Sheets

METHOD AND APPARATUS FOR CLIPPING VIDEO INFORMATION BEFORE SCALING

BACKGROUND OF THE INVENTION

1. Field of the Invention

This invention relates to the field of digital video, and, more specifically, to digital video applications in a network environment.

Sun, Sun Microsystems, the Sun logo, Java and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computers and computer networks are used to exchange information in many fields such as media, commerce, and telecommunications, for example. One form of information that is commonly exchanged is video data (or image data), i.e., data representing a digitized image or sequence of images. A video conferencing feed is an example of telecommunication information which includes video data. Other examples of video data include video streams or files associated with scanned images, digitized television performances, and animation sequences, or portions thereof, as well as other forms of visual information that are displayed on a display device. It is also possible to synthesize video information by artificially rendering video data from two or three-dimensional computer models.

The exchange of information between computers on a network occurs between a "transmitter" and a "receiver." In video applications, the information contains video data, and the services provided by the transmitter are associated with the processing and transmission of the video data. An issue in all network applications is utilization of network bandwidth. For video applications, bandwidth is an even greater concern due to the large amounts of data involved in transmitting one or more frames of video data. For example, consider a raw workstation video signal of twenty-four bit RGB data, sent in frames of 1280×1024 pixels at sixty frames per second. The raw workstation video represents approximately 240 MBps (megabytes per second) of continuous data. Even for smaller frame sizes, video data can represent a significant load on a network, resulting in poor video performance if the required bandwidth cannot be provided. Further, other applications on the network may suffer as bandwidth allocations are reduced to support the video transmission. To provide a better understanding of video and its limitations, a general description of computer graphics and video technology is given below.

General Video Technology

In digital video technology, a display is comprised of a two dimensional array of picture elements, or "pixels," which form a viewing plane. Each pixel has associated visual characteristics that determine how a pixel appears to a viewer. These visual characteristics may be limited to the perceived brightness, or "luminance," for monochrome displays, or the visual characteristics may include color, or "chrominance," information. Video data is commonly provided as a set of data values mapped to an array of pixels. The set of data values specify the visual characteristics for those pixels that result in the display of a desired image. A variety of color models exist for representing the visual characteristics of a pixel as one or more data values.

RGB color is a commonly used color model for display systems. RGB color is based on a "color model" system. A color model allows convenient specification of colors within a color range, such as the RGB (red, green, blue) primary colors. A color model is a specification of a three-dimensional color coordinate system and a three-dimensional subspace or "color space" in the coordinate system within which each displayable color is represented by a point in space. Typically, computer and graphic display systems are three-phosphor systems with a red, green and blue phosphor at each pixel location. The intensities of the red, green and blue phosphors are varied so that the combination of the three primary colors results in a desired output color.

An example of a system for displaying RGB color is illustrated in FIG. 1. A frame buffer 140, also known as a video RAM, or VRAM, is used to store color information for each pixel on a video display, such as CRT display 160. DRAM can also be used as buffer 140. VRAM 140 maps one memory location for each pixel location on the display 160. For example, pixel 190 at screen location $X_0Y_0$ corresponds to memory location 150 in VRAM 140. The number of bits stored at each memory location for each display pixel varies depending on the amount of color resolution required. For example, for word processing applications or display of text, two intensity values are acceptable so that only a single bit need be stored at each memory location (since the screen pixel is either "on" or "off"). For color images, however, a plurality of intensities must be definable. For certain high end color graphics applications, it has been found that twenty-four bits per pixel produces acceptable images.

Consider, for example, that in the system of FIG. 1, twenty-four bits are stored for each display pixel. At memory location 150, there are then eight bits each for the red, green and blue components of the display pixel. The eight most significant bits of the VRAM memory location could be used to represent the red value, the next eight bits represent the green value and the eight least significant bits represent the blue value. Thus, 256 shades each of red, green and blue can be defined in a twenty-four bit per pixel system. When displaying the pixel at X0, Y0, the bit values at memory location 150 are provided to video driver 170. The bits corresponding to the red (R) component are provided to the red driver, the bits representing the green (G) component are provided to the green driver, and the bits representing the blue (B) component are provided to the blue driver. These drivers activate the red, green and blue phosphors at the pixel location 190. The bit values for each color, red, green and blue, determine the intensity of that color in the display pixel. By varying the intensities of the red, green and blue components, different colors may be produced at that pixel location.

Color information may be represented by color models other than RGB. One such color model is known as the YUV (or Y'CbCr as specified in ITU.BT-601) color space which is used in the commercial color TV broadcasting system. The YUV color space is a recoding of the RGB color space, and can be mapped into the RGB color cube. The RGB to YUV conversion that performs the mapping may be defined, for example, by the following matrix equation:

$$\begin{bmatrix} Y' \\ U' \\ V' \end{bmatrix} = \begin{bmatrix} Y' \\ Cb \\ Cr \end{bmatrix} = \begin{bmatrix} 0.299 & 0.587 & 0.144 \\ -0.169 & -0.331 & 0.500 \\ 0.500 & -0.419 & -0.081 \end{bmatrix} \cdot \begin{bmatrix} R' \\ G' \\ B' \end{bmatrix}$$

The inverse of the matrix is used for the reverse conversion. The Y axis of the YUV color model represents the luminance of the display pixel, and matches the luminosity response curve for the human eye. U and V are chrominance values. In a monochrome receiver, only the Y value is used. In a color receiver, all three axes are used to provide display information.

In operation, an image may be recorded with a color camera, which may be an RGB system, and converted to YUV for transmission. At the receiver, the YUV information is then retransformed into RGB information to drive the color display.

Many other color models are also used to represent video data. For example, CMY (cyan, magenta, yellow) is a color model based on the complements of the RGB components. There are also a variety of color models, similar to YUV, which specify a luminance value and multiple chrominance values, such as the YIQ color model. Each color model has its own color transformation for converting to a common displayable video format such as RGB. Most transformations may be defined with a transform matrix similar to that of the YIQ color space.

Image data is often provided as output of an application executing on a computer system. More than one such application may output image data to the same display device. For example, in a windowing display environment, a window manager may be implemented to manage the display of data from multiple applications into multiple windows on the display device.

FIG. 2 is a block diagram of a video display system comprising multiple applications (200 and 201) writing to a single frame buffer (140) under control of a window manager (202). As illustrated, applications 200 and 201 are coupled to transmission medium 203, as are window manager 202 and frame buffer 140. Frame buffer 140 drives display 160 as described with respect to FIG. 1. Transmission medium 203 may be a high-bandwidth bus in a personal computer system. In a network environment, such as one implementing thin clients or terminals, transmission medium 203 may comprise a lower bandwidth network that is shared with other applications executing on one or more servers, as well as frame buffers supporting other client displays.

In FIG. 2, window manager 202 manages the way in which video output of applications 200 and 201 (and the video output of any other application operating under the given windowing environment) is displayed on display 160. Applications 200 and 201 register with window manager 203 when those applications have video output to be displayed. In accordance with one frame buffer access scheme, when an application wishes to write to the frame buffer 140, the application may transmit a write request to window manager 202. Window manager 202 then writes the specified image data to the frame buffer on behalf of the application. However, in a direct graphics access (DGA) scheme, the applications may write directly to the frame buffer, bypassing window manager 202.

A mechanism by which window manager 202 manages video output is via a clip-list associated with frame buffer 140. A clip-list provides information about which portions of a frame buffer, and hence the display, may be written by a given application. The clip-list may, for example, take the form of a bit mask or a list of rectangles that defines those portions of an application display window that are not overlapped by another window and are, therefore, visible to the user. When a user alters a window on the display (e.g., by closing, opening, dragging or resizing the window, or reordering layered windows), window manager 202 modifies the clip-list accordingly. When an application attempts to write to frame buffer 140, the application determines that the clip-list has changed, and modifies its frame buffer writing operations appropriately.

In some systems, frame buffer 140 has an associated lock that must be obtained by an application before access to the buffer is granted. For example, if application 200 wishes to draw to display 160 by writing to frame buffer 140, application 200 must first obtain the frame buffer lock. If another application currently has the lock, application 200 must wait until the lock is released by that other application. In similar fashion, window manager 202 must obtain the frame buffer lock to access the associated clip-list.

FIG. 3 is a block diagram illustrating an example of a display image 300 that could be displayed on display 160. Display image 300 comprises a desktop window (window D) and application windows A, B and C. Application windows A–C may represent the video output of one or more applications, such as applications 200 and 201 of FIG. 2. The desktop window (D) may represent output of window manager 202, or an associated windowing application. As shown, window A is partially occluded by windows B and C. Window B exists on top of, and within the borders of, window A, whereas window C overlaps the lower right corner of window A.

FIG. 3 also comprises clip-list 301, containing a list of rectangles associated with each application. The display region assigned to an application includes a patchwork of rectangles representing those portions of the display containing the application window, excluding those regions occluded by another overlying window. The visible (and thus writable) portions of desktop window (D) include rectangles D1, D2, D3, D4, D5 and D6. The visible portions of window A include rectangles A1, A2, A3, A4 and A5. Windows B and C, being on the top layer, are unoccluded. Windows B and C include rectangles B1 and C1, respectively.

Assuming that window A corresponds to application 200, when application 200 writes to frame buffer 140, application 200 will typically write only to those portions of the frame buffer corresponding to rectangles A1–A5. If the alignment state of windows A–C is modified, the clip-list will change accordingly. For example, if window B is closed or shifted behind window A, then rectangle B1 is reassigned to window A and application 200. Application 200 will recognize the change to the clip-list upon its next frame buffer access.

FIG. 4 is a flow diagram illustrating a process by which application 200 might display image data in window A. In step 400, application 200 obtains image data, such as an M×N block of YUV image data (404). This data may be obtained from another video source, from an image file, or from a rendered image, for example. In step 401, the image data is color converted into image data supported by the display, e.g., M×N RGB color data 405 suitable for driving a CRT display.

Based on the resolution of window A, RGB image data 405 is scaled to fill the window in step 402. Assuming horizontal and vertical resolution scale factors α and β, the resulting image data is αM×βN RGB data 406, containing (α×β) times as much image data as original image data 404. For example, assuming doubled resolution (e.g., from 320× 240 to 640×480) with α=β=2, the scaled image data is four times as large as the original image data. In step 403, the scaled image data 406 is clipped in accordance with the clip-list function $F_C(\ )$ which extracts only those regions that are viewable. The viewable regions represented by clipped image 407 are written to the frame buffer for display.

For a single computer system in which an executing application is separated from the frame buffer only by a high-bandwidth processor bus, the video display process of FIG. 4 may be adequate. However, in a network system, particularly one implementing thin clients, it may be desired to have the video application execute on a server separated from the frame buffer (and clip-list) by a shared, lower-bandwidth network. It is also possible that the applications and the window manager are executed on separate servers. Under these conditions, the transmission of image data, in the form of scaled image data 406 or clipped image data 407, for every video application on the network may be prohibitive. In a network, transmission efficiency is important to the satisfactory performance of not only the video application being displayed, but other applications sharing the network. A more efficient video display process for networks is desired.

SUMMARY OF THE INVENTION

A method and apparatus for clipping video information before scaling is described. In an embodiment of the invention, a transmitter obtains video information in the form of image data, as well as clipping information defining one or more display regions in which the image data is to be displayed. In accordance with the clipping information, the transmitter performs clipping operations on the image data, and transmits the clipped image data to a receiver. Prior to displaying the clipped image data, the receiver performs any needed scaling of the clipped image data to conform to the dimensions of the display regions. By performing clipping operations prior to transmission, and scaling operations subsequent to transmission, unnecessary image data is omitted and greater transmission efficiency is achieved.

In one embodiment of the invention, the clipping information specifies rectangular display regions within a larger display boundary assigned to the image data. When clipping, the transmitter maps the rectangular display regions to corresponding rectangular data regions of the image data. The rectangular data regions are individually transmitted to the receiver where those data regions are scaled to meet the dimensions of the corresponding display regions.

DETAILED DESCRIPTION OF THE INVENTION

The invention is a method and apparatus for clipping video information before scaling. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Implementation of Network Video Display Process

Figure 1:
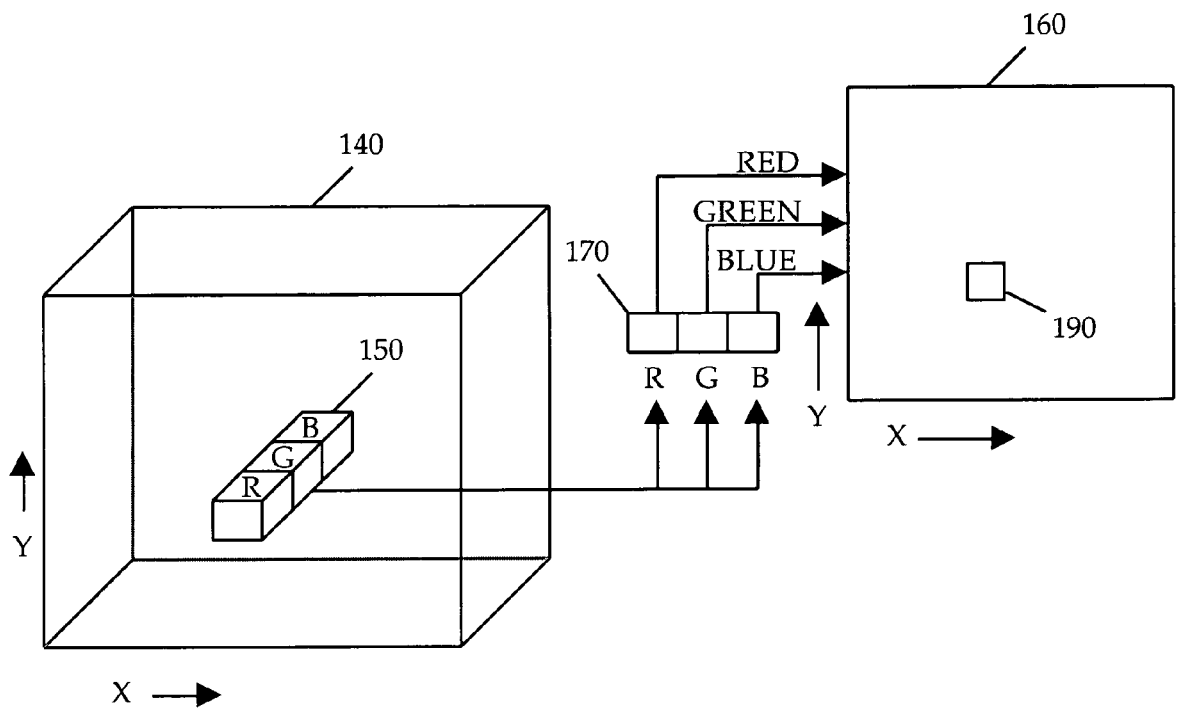
FIG. 1 is a block diagram of a video display apparatus.
Figure 2:
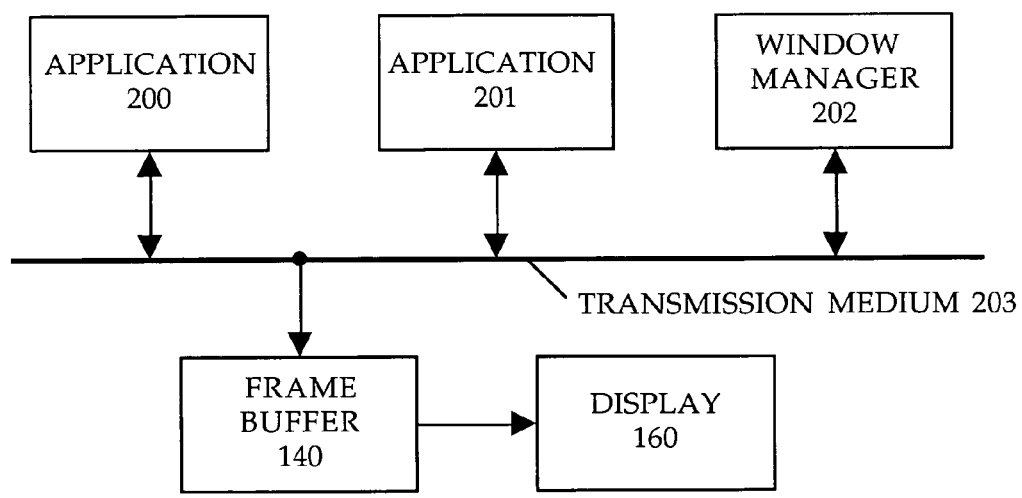
FIG. 2 is a block diagram of a video display system having multiple applications.
Figure 3:
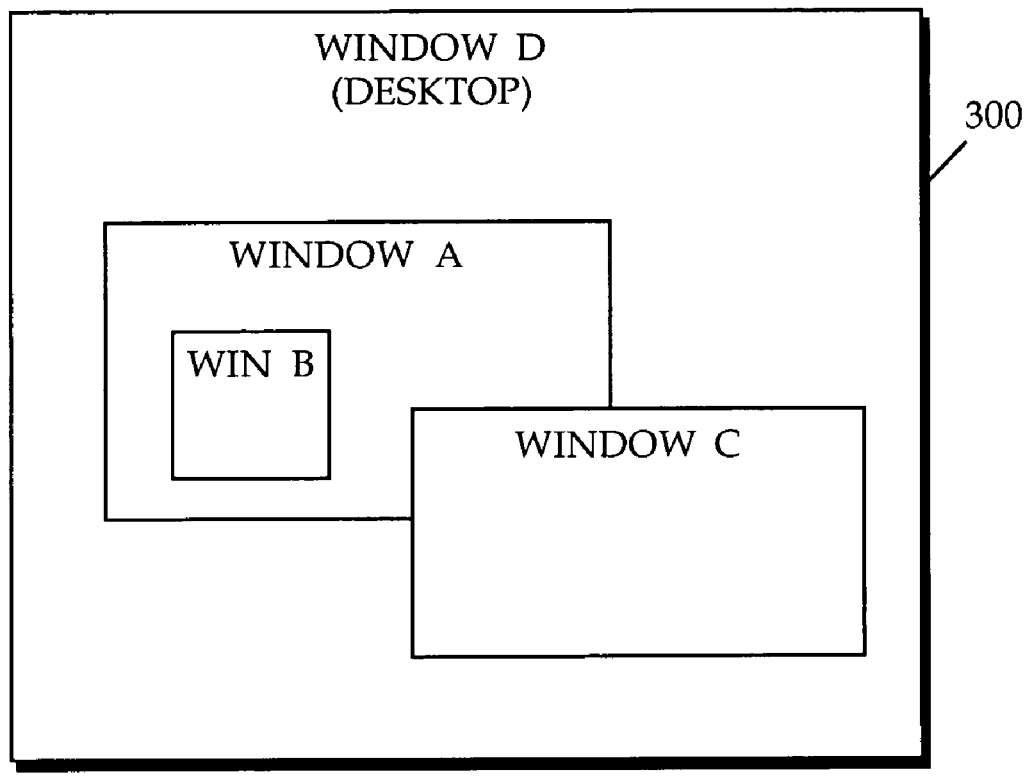
FIG. 3 illustrates a display having multiple overlapping windows, and an associated clip-list.
Figure 3:
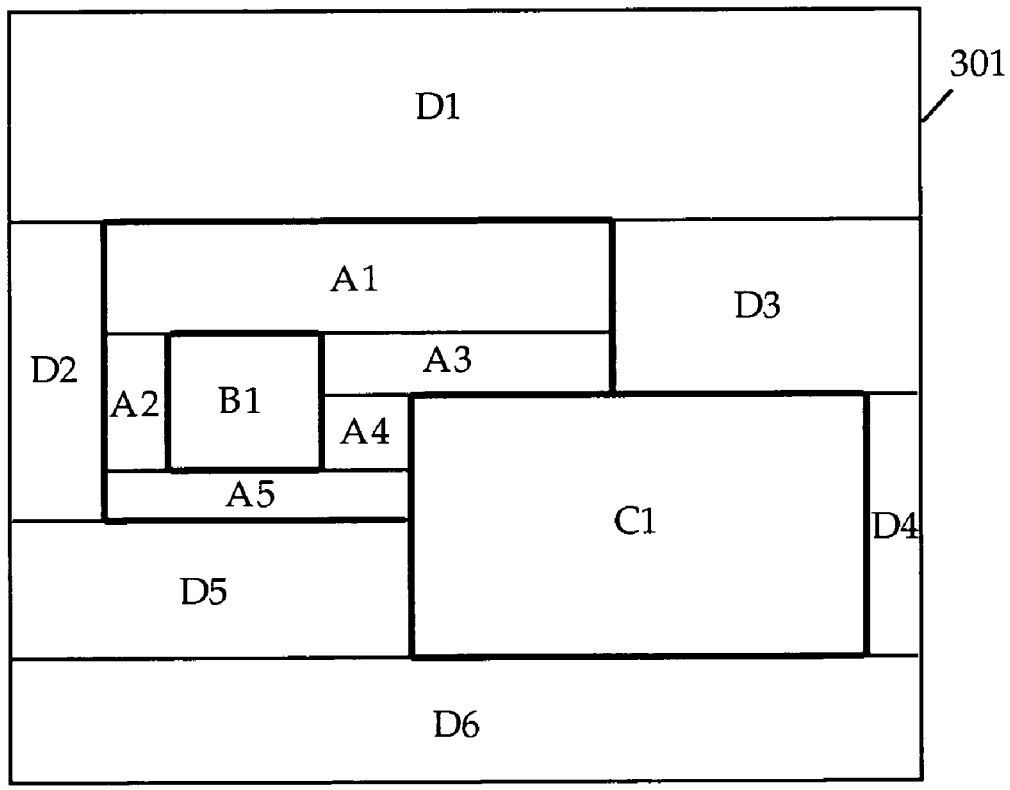
Figure 4:
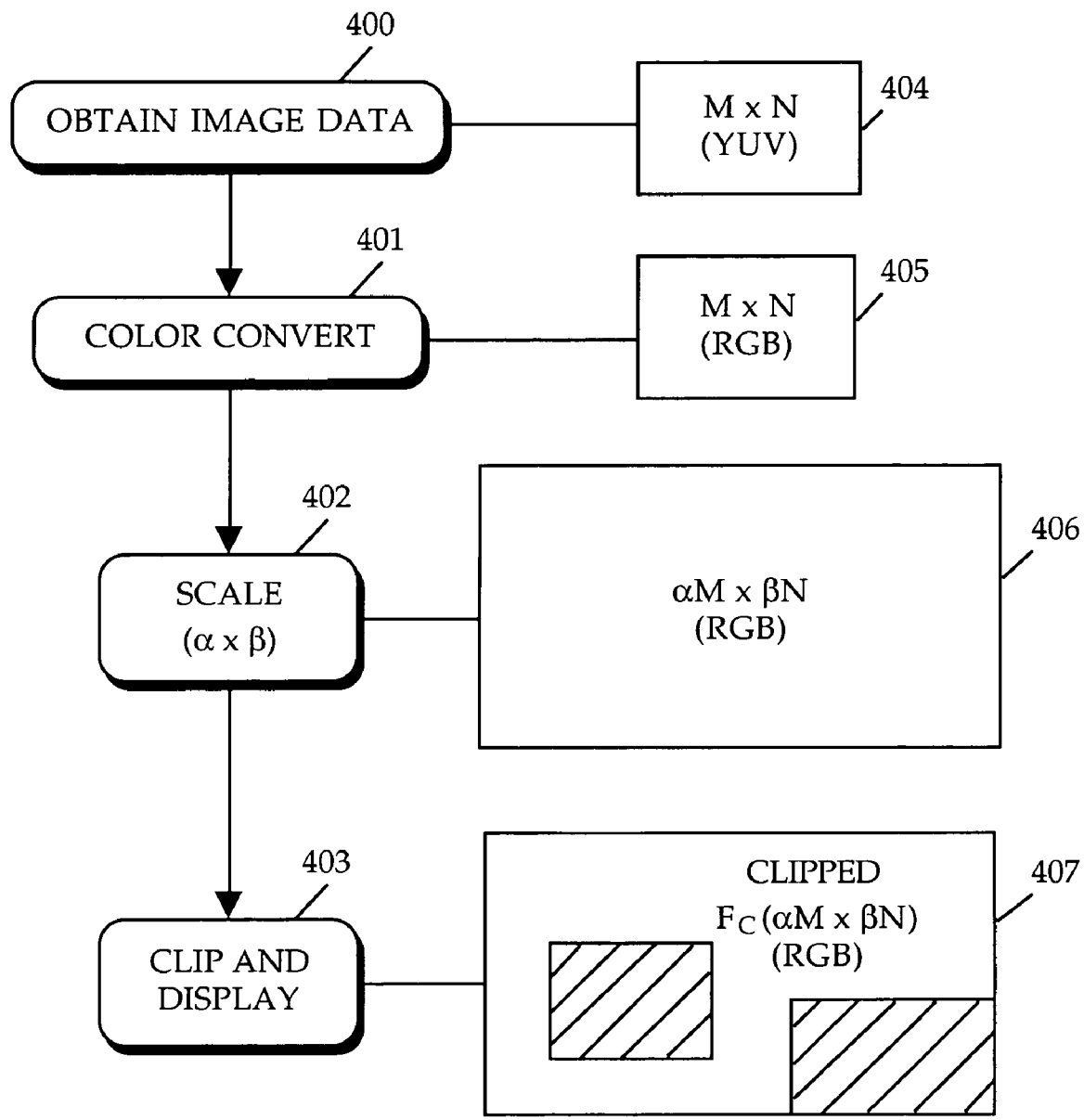
FIG. 4 is a flow diagram of a video display process.

In an embodiment of the invention, applications are executed on a server separated from a frame buffer on a thin client by a network. In reference to FIG. 2, the network acts as transmission medium 203. The server can be considered as a video transmitter with the thin client acting as the receiver. By performing clipping of image data prior to transmission and scaling, the amount of image data that is transmitted over the network is minimized for greater efficiency.

To facilitate clipping at the server, each application is provided with a clip-list upon which to base its respective clipping operations. An application writes to the frame buffer in asynchronous packets of image data that are queued by the client. As changes are made to windows, the window manager application updates the status of each registered application's clip-list.

Figure 5:
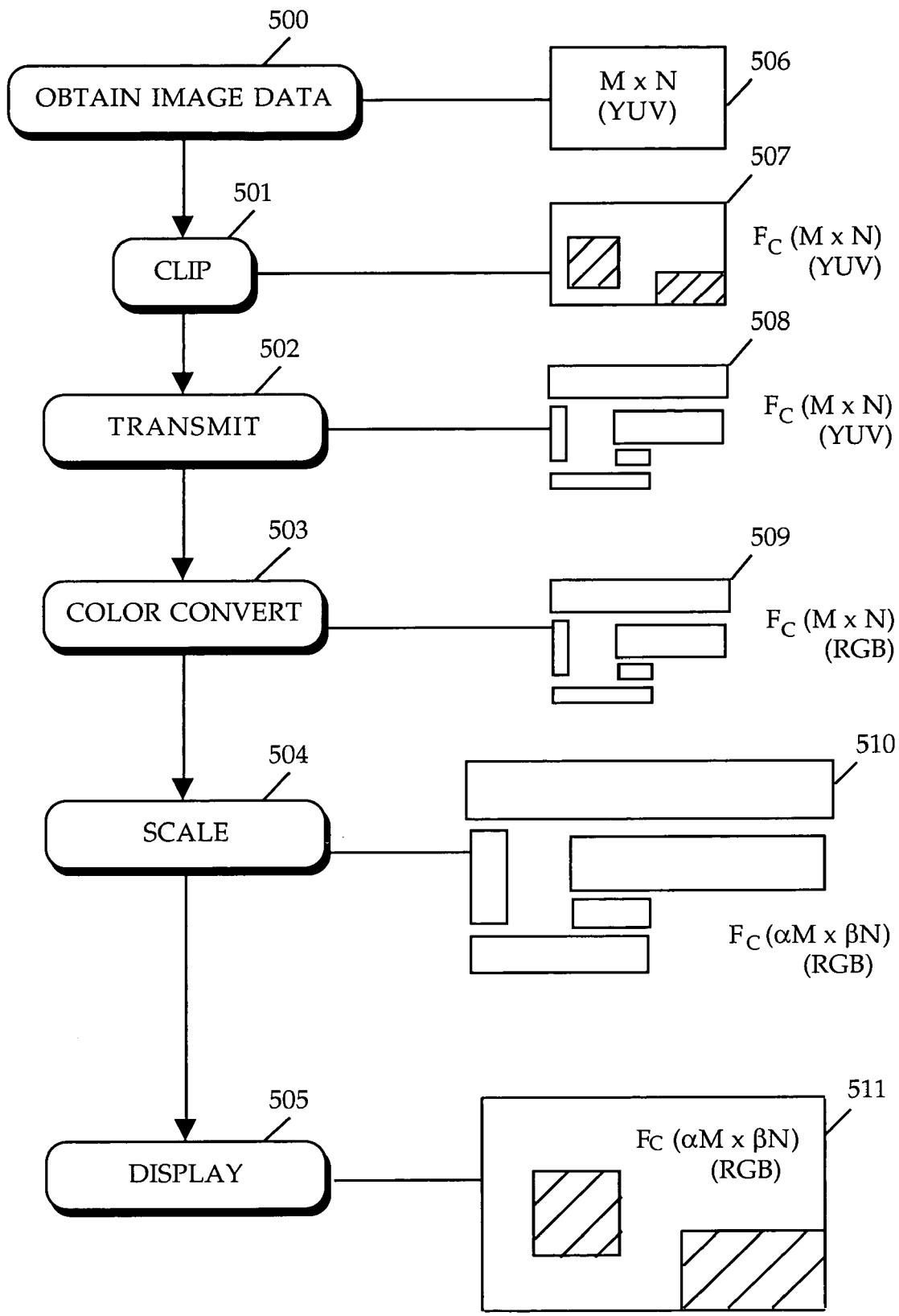
FIG. 5 is a flow diagram of a video display process in accordance with an embodiment of the invention.

FIG. 5 is a flow diagram of a video display process in accordance with an embodiment of the invention. In step 500, application 200 (executing on a server) obtains M×N image data 506 (e.g., in YUV or another known color scheme) to be output to window A of the display. This image data may be obtained from another video source, from an image file, or from a rendered image, for example. In step 501, based on a resident copy of the clip-list identifying those portions of the frame buffer representing visible regions of window A, application 200 applies a clipping function $F_C(\ )$ to the image data to obtain clipped image date 507. Clipped image data 507 is transmitted from the server to the client in step 502. In one embodiment, the transmitted image data 508 is transmitted in blocks corresponding to rectangles in the clip-list (or sub-rectangles of the clip-list rectangles).

In step 503, a receiver process executing at the client receives the transmitted image data 508 and converts, if necessary, the transmitted image data 508 into image data 509 of a displayable color format such as RGB. Image data 509 is scaled in step 504 to generate image data 510 having the resolution of display window A. Alternatively, steps 503 and 504 may be reversed such that color conversion is carried out on scaled image data. In step 505, the scaled and color converted image data is written to the frame buffer to provide displayed image 511 filling all unoccluded portions of window A.

In FIG. 5, the bandwidth requirements for transmission of the image data at step 502 are reduced due to the extraction of occluded data by the clipping process. A further reduction in bandwidth requirements is achieved by performing upscaling of image data after transmission, in step 504.

Figure 6A:
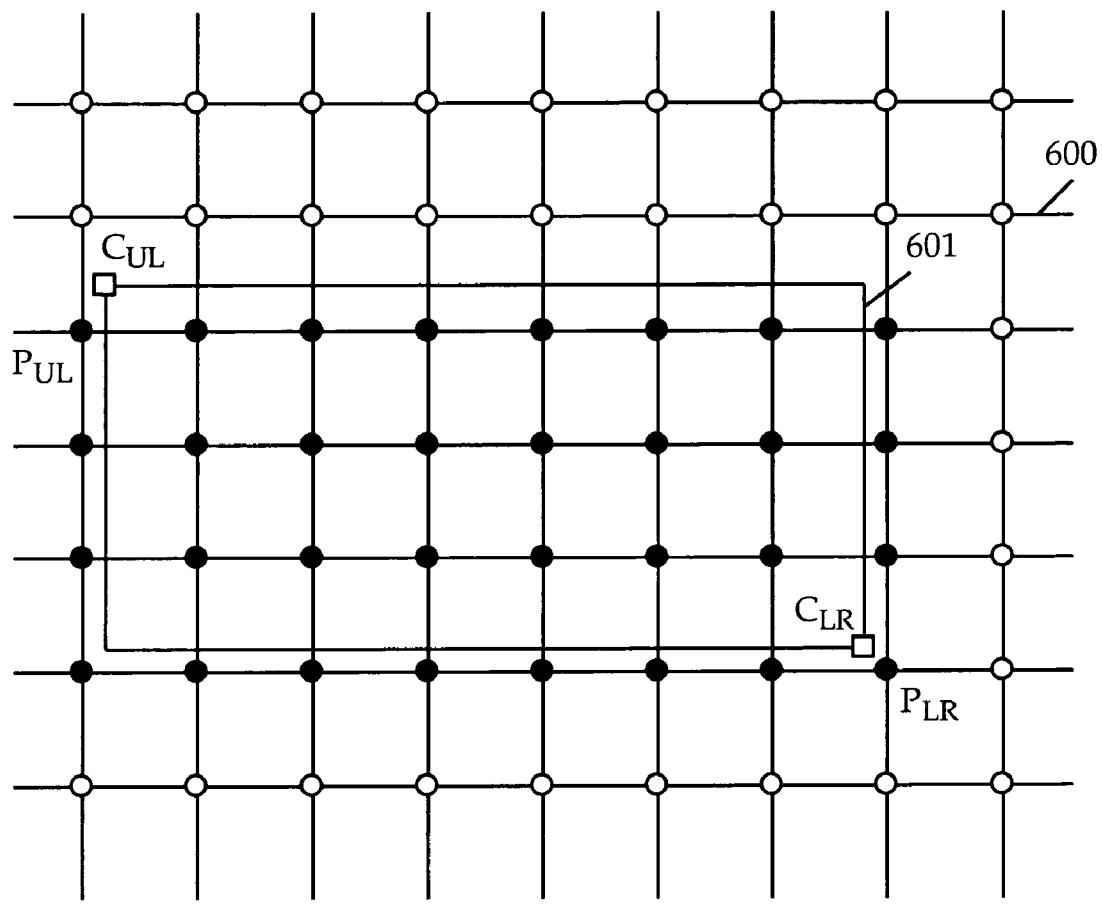
FIGS. 6A–6C illustrate the mapping of a clip rectangle to image data in accordance with an embodiment of the invention.
Figure 6B:
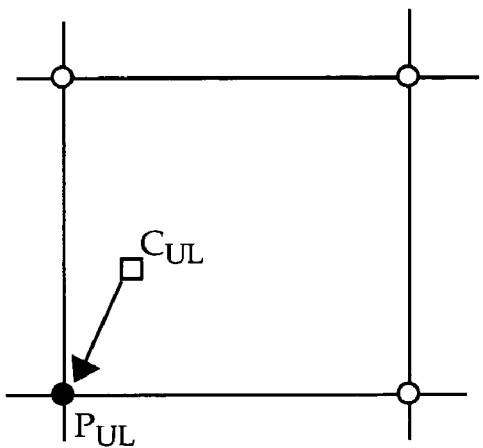
Figure 6C:
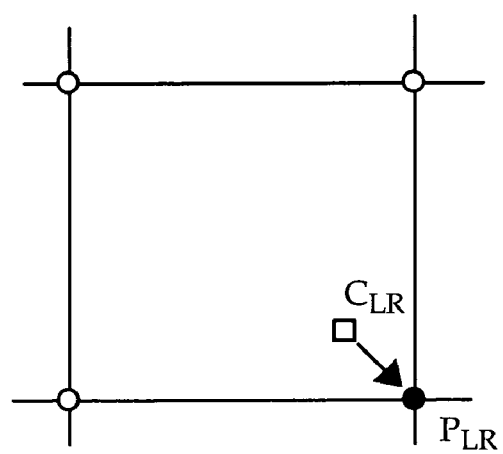

FIGS. 6A–6C illustrate the mapping of a clip rectangle (such as one of rectangles A1–A5) to image data in accordance with an embodiment of the invention. FIG. 6A comprises an array of image data (600) and clip rectangle 601. Clip rectangle 601 is defined by an upper left corner location, $C_{UL}$, and a lower right corner location, $C_{LR}$. As shown, because the respective resolutions for the image data and the display data (and hence the clip rectangle) may differ, the corners of the clip rectangle may not correspond to pixels of the image data. Rather, the corner locations of the clip rectangle will map into a neighborhood of four image data pixels in this example.

FIGS. 6A and 6B show enlarged portions of image data 600 comprising the four nearest pixel locations to the upper left and lower right corners, respectively, of the clip rectangle 601. Upper left corner location $C_{UL}$ of the clip rectangle is mapped to the nearest image data pixel $P_{UL}$, whereas, the lower right corner location $C_{LR}$ of the clip rectangle is mapped to the nearest image data pixel $P_{LR}$. The nearest pixel may be determined, for example, based on the smallest Euclidean distance from the corner location. The portion of image data 600 that is mapped to clip rectangle 601 is the rectangle of image data (indicated with filled-in ovals) defined by pixels $P_{UL}$ and $P_{LR}$. It will be obvious that other locations within the clip rectangle (such as the upper right and lower left corners) may be similarly used to determine a rectangle of image data.

In one embodiment of the invention, where the original image data comprises more than a single resolution (such as YUV with subsampled chroma values), the pixel array is defined using the lowest resolution to ensure that the mapped rectangle of image data comprises complete pixel data. For example, using YUV data with chroma values subsampled by two, each pixel contains a luma (Y) value, but chroma values (U,V) are skipped every other pixel location along each axis. This embodiment ensures that pixels PUL and PLR are the nearest pixels that contain both luma and chroma values.

As illustrated in FIG. 6A, mapping clip rectangle 601 onto image data 600 results in a rectangle of image data that is slightly larger than the clip rectangle in the horizontal axis, and slightly smaller along the vertical axis. When the rectangle of image data is scaled up at the client (receiver), this results in slightly reduced scaling along the horizontal axis, and slightly increased scaling along the vertical axis. There may be a slight horizontal and/or vertical shift of the image data as well. For windows that are partially occluded, multiple clip rectangles will be mapped to the image data, with each resulting rectangle of image data possibly having slightly different scale and shift factors from the other rectangles. However, those slight variations produce substantially negligible visual distortion.

Figure 7:
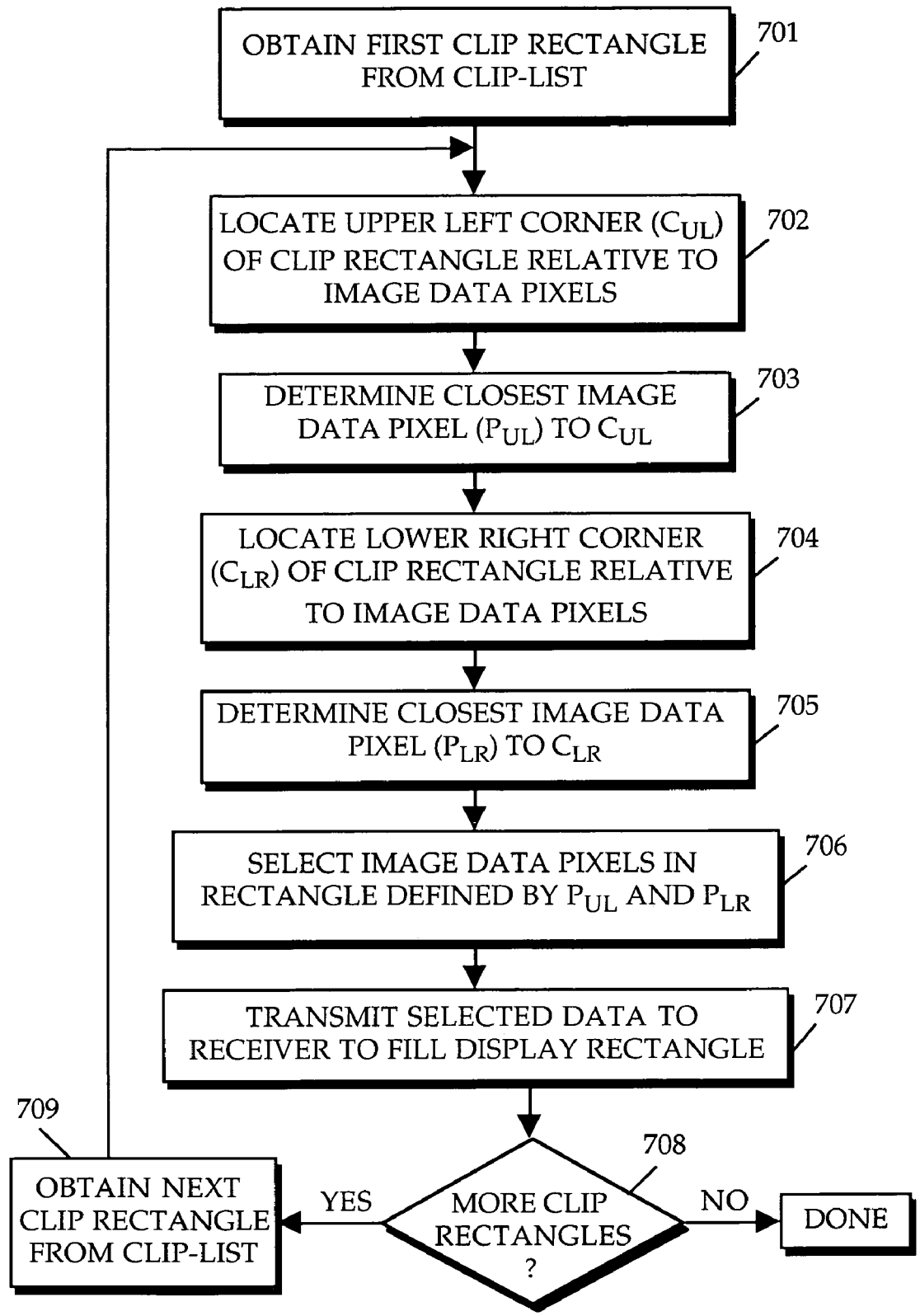
FIG. 7 is a flow diagram of a process for mapping a clip rectangle to image data in accordance with an embodiment of the invention.

FIG. 7 is a flow diagram of a clipping process in accordance with an embodiment of the invention. In step 701, the first clip rectangle from the clip-list is obtained. The clip rectangle is effectively scaled down to the resolution of the image data, though the location values within the clip rectangle (e.g., $C_{UL}$ and $C_{LR}$) reside at fractional pixel locations with respect to the image data. In step 702, the upper left corner ($C_{UL}$) of the clip rectangle is identified, and, in step 703, the closest image data pixel ($P_{UL}$) is determined. In step 704, the lower right corner ($C_{LR}$) of the clip rectangle is identified, and, in step 705, the closest image data pixel ($P_{LR}$) is determined. In step 706, those image data pixels in the rectangle defined by pixels $P_{UL}$ and $P_{LR}$ are selected for display. The selected rectangle of image data pixels are transmitted to the receiver in step 707 to fill the display region defined by the respective clip rectangle. If no more clip rectangles exist in step 708 (meaning that all portions of the display window are either filled or occluded by other windows), display of the current frame of image data is complete. If clip rectangles in the clip-list remain to be processed in step 708, the next clip rectangle is obtained at step 709, and the process continues at step 702.

As described in FIG. 7, in one embodiment, clip rectangles are processed, and the resulting image data rectangles are transmitted for display, individually. This method conforms well to a packet delivery format. One such format suitable for implementing an embodiment of the invention is described below.

Video Protocol Embodiment

In an embodiment of the invention, a video protocol is implemented in which data packets are used to transmit variably sized blocks of video data between a transmitter and a receiver using a connectionless datagram scheme. A connectionless scheme means that each packet of video data, i.e., each video block, is processed as an independent unit, and the loss of a data packet does not affect the processing of other data packets. This independence provides for robust video processing even on unreliable networks where packet loss may be commonplace.

Some networks are prone to periodic packet loss, i.e., packet loss at regular intervals. This periodic behavior can result in the stagnation of portions of the video display as the same video blocks are repeatedly lost. To prevent video block stagnation, the spatial order in which video blocks are sent to the receiver for display may be pseudo-randomly determined to disrupt any periodicity in packet performance.

In one embodiment, the data packets containing video data are provided with a sequence number. By tracking the sequence numbers, the receiver can note when a sequence number is skipped, indicating that the packet was lost during transmission. The receiver can then return to the transmitter a list or range of sequence numbers identifying the lost packet or packets. When the transmitter receives the list or range of sequences, the transmitter can decide whether to ignore the missed packets, resend the missed packets (such as for still images), or send updated packets (such as for streaming video that may have changed since the packet was lost).

In one embodiment of the invention, the video data packet comprises the following information:

Sequence number—A video stream is processed as a series of blocks of video data. The sequence number provides a mechanism for the receiver to tell the transmitter what sequence numbers have been missed (e.g., due to packet loss), so that the transmitter may determine whether to resend, update or ignore the associated video block.

X—The X field designates the x-coordinate of the receiver's display device where the video block is to be displayed, e.g., the x-coordinate of the first pixel (i.e., the upper-left corner) of the video block.

Y—The Y field designates the y-coordinate of the receiver's display device where the video block is to be displayed, e.g., the y-coordinate of the first pixel (i.e., the upper-left corner) of the video block.

Width—The width field specifies the width of the destination rectangle on the receiver's display device wherein the video block is to be displayed.

Height—The height field specifies the height of the destination rectangle on the receiver's display device wherein the video block is to be displayed.

Source_w—The source width specifies the width of the video block in pixels. Note that the source width may be smaller than the width of the destination rectangle on the receiver's display device. If this is so, the receiver will upscale the video block horizontally to fill the width of the destination rectangle. The source width should not be larger than the width of the destination rectangle as this implies downscaling, which should be performed by the transmitter for efficiency.

Source_h—The source height specifies the height of the video block in pixels. Note that, as with source_w, the source height may be smaller than the height of the destination rectangle on the receiver's display device. As above, the receiver will upscale the video block vertically to fill the height of the destination rectangle. The source height should not be larger than the height of the destination rectangle as this implies downscaling, which should be performed by the transmitter for efficiency.

Luma encoding—The luma encoding field allows the transmitter to designate a particular luma encoding scheme from a set of specified luma encoding schemes.

Chroma_sub_X—This field allows the transmitter to designate the degree of horizontal subsampling performed on the video data chroma values.

Chroma_sub_Y—This field allows the transmitter to designate the degree of vertical subsampling performed on the video data chroma values.

Video data—The video data includes (source_w*source_h) pixel luma values (Y), and ((source_w/chroma_sub_x)* (source_h/chroma_sub_y)) signed chroma values (U, V or Cb, Cr).

YUV (Y'CbCr) Color

In an embodiment of the invention, the color model of the video protocol is specified by the International Telecommunications Union in ITU.BT-601 referring to an international standard for digital coding of television pictures using video data components Y'CbCr, where Y' is a luminance or "luma" value, Cb (or U') is a first chromaticity or "chroma" value represented as a blue color difference proportional to (B'-Y') and Cr (or V') is a second chroma value represented as a red color difference proportional to (R'-Y') (Note that primed values such as Y' indicate a gamma corrected value). This ITU specification is independent of any scanning standard and makes no assumptions regarding the "white" point or CRT gamma. For 0<=(R,G,B)<=1, the range for Y' is 0<=Y'<=1 and the range for Cb and Cr is -0.5<=(Cb, Cr)<=0.5.

The R'G'B'<—> Y'CbCr color transforms are as follows:

$$\begin{bmatrix} Y' \\ U' \\ V' \end{bmatrix} = \begin{bmatrix} Y' \\ Cb \\ Cr \end{bmatrix} = \begin{bmatrix} 0.299 & 0.587 & 0.144 \\ -0.169 & -0.331 & 0.500 \\ 0.500 & -0.419 & -0.081 \end{bmatrix} \cdot \begin{bmatrix} R' \\ G' \\ B' \end{bmatrix}$$

$$\begin{bmatrix} R' \\ G' \\ B' \end{bmatrix} = \begin{bmatrix} 1 & 0 & 1.403 \\ 1 & -0.344 & -0.714 \\ 1 & 1.773 & 0 \end{bmatrix} \cdot \begin{bmatrix} Y' \\ U' \\ V' \end{bmatrix}$$

Under the specified protocol, the transmitter performs any transformations required to convert the video data into the YUV format. This may include performing the RGB to YUV matrix conversion shown above to convert RGB data. Transformations may also include decompression from other color formats (e.g., H.261, MPEG1, etc.). The receiver can drive an RGB display device by performing the above matrix operation to convert incoming YUV (Y'CbCr) data received from a transmitter into RGB data for display at the display rectangle identified in the data packet. No other color transformations are necessary at the receiver. The receiver is also able to accept RGB data in the same video block format because RGB data is directly supported in the receiver. For transmission efficiency, however, any sizable video data transfers between a transmitter and receiver should be performed in the YUV color format to take advantage of the compression schemes described below.

Luma Compression

In each data packet containing a video block, there are (source_w* source_h) luma values—one for each pixel. If the luma encoding field indicates that no encoding is being performed, the luma values are unsigned eight-bit values. If, however, luma encoding is indicated in the luma encoding field, the luma values are encoded to achieve a compression ratio of 2:1. In an embodiment of the invention, the luma value "Y" is compressed using a quantized differential coding (QDC) scheme. In other embodiments, other compression schemes may be specified in the luma encoding field.

Luma values do not tend to vary significantly from one pixel to another. It is therefore possible to transmit the difference value between luma values for consecutive pixels rather than the luma values themselves. Further, the luma difference values can be satisfactorily quantized to one of sixteen quantization levels, each of which is identified by a four-bit code word. The quantization is non-linear, with more quantization levels near zero where luma differences between consecutive pixels are more likely to occur.

In one embodiment, the luma difference quantization is performed according to the following table:

| Difference Range | Code (Binary) | Quantized Difference Level |
| --- | --- | --- |
| −255 to −91 | 0 (0000) | −100 |
| −90 to −71 | 1 (0001) | −80 |
| −70 to −51 | 2 (0010) | −60 |
| −50 to −31 | 3 (0011) | −40 |
| −30 to −16 | 4 (0100) | −20 |
| −15 to −8 | 5 (0101) | −10 |
| −7 to −3 | 6 (0110) | −4 |
| −2 to 0 | 7 (0111) | −1 |
| 1 to 2 | 8 (1000) | 1 |
| 3 to 7 | 9 (1001) | 4 |
| 8 to 15 | 10 (1010) | 10 |
| 16 to 30 | 11 (1011) | 20 |
| 31 to 50 | 12 (1100) | 40 |
| 51 to 70 | 13 (1101) | 60 |
| 71 to 90 | 14 (1110) | 80 |
| 91 to 255 | 15 (1111) | 100 |

The luma compression scheme is based on a subtraction of a "last_value" from the current pixel luma value to generate the luma difference. "Last_value" is used to model the luma value of the preceding pixel. To prevent divergence of the compression and decompression processes, the "last_value" is modeled to account for the previous quantized luma difference rather than to match the actual luma value of the last pixel. The modeled "last_value" in the compression process therefore matches the corresponding modeled "last_value" extracted in the decompression process.

Chroma Compression

The human eye is less sensitive to chroma information than to luma information, particularly in a spatial sense. For example, if, in generating an image, some of the chroma information is spread beyond the actual edges of an object in the image, the human eye will typically pick up on the edge cues provided by the luma information and overlook the inaccuracies in the spatial location of the chroma information. For this reason, some latitude can be taken with the manner in which chroma information is provided. Specifically, subsampling may be performed without significantly degrading visual quality.

In accordance with an embodiment of the invention, the amount of chroma information, and hence the amount of chroma compression, is specified by the chroma_sub_X and chroma_sub_Y fields in the video block data packet. If the values for both of those fields are zero, then there is no chroma information and the video block is monochrome, i.e., luma only. One possible specification for chroma subsampling is:

0—No chroma values; monochrome image
1—Subsample by one (i.e., no subsampling)
2—Subsample by two
3—Subsample by four Further subsample arrangements may be provided by extending the above specification. Chroma_sub_X and chroma_sub_Y independently specify subsampling along respective axes. Several subsampling arrangements achieved by different combinations of chroma_sub_X and chroma_sub_Y, as defined above, are:

| chroma sub X | chroma sub Y | one chroma value per | compression |
|---|---|---|---|
| 0 | 0 | 0, no chroma data | — |
| 0 | 1 | not permitted | — |
| 1 | 0 | not permitted | — |
| 1 | 1 | pixel | 1:1 |
| 2 | 1 | 1 × 2 pixel array | 2:1 |
| 1 | 2 | 2 × 1 pixel array | 2:1 |
| 3 | 1 | 1 × 4 pixel array | 4:1 |
| 1 | 3 | 4 × 1 pixel array | 4:1 |
| 3 | 2 | 2 × 4 pixel array | 8:1 |
| 2 | 3 | 4 × 2 pixel array | 8:1 |
| 3 | 3 | 4 × 4 pixel array | 16:1 |

Subsampling may be performed when packing data into a video block data packet by taking data only at the specified intervals in the specified directions. For example, for encoded value (chroma_sub_X, chroma_sub_Y)=(3, 2), chroma data would be taken at every fourth pixel along each row, and every other row would be skipped. Other schemes may be used to select a single pixel from the subsampling matrix, such as pseudo-random assignments. Further, the chroma values from each pixel in a subsampling matrix may be used to calculate a single set of average chroma values (U, V) for each subsampling matrix.

Subsampling is performed as the video block data packet is being packed and may occur before or after luma compression as luma and chroma compression are substantially independent. When the video block data packet reaches the receiver, the chroma subsamples are upsampled prior to being converted to RGB. Upsampling may be accomplished by taking the subsampled chroma information and duplicating or interpolating the chroma values for each pixel in the associated subsampling matrix.

Upscaling and Downscaling of Video Data

In an embodiment of the invention, the pixel array size of the source video block may differ from the size of the destination rectangle on the receiver's display. This size variation allows for a receiver with a large display to "blow up" or upscale a small video scene to make better use of the display resources. For example, a receiver may wish to upscale a 640×480 video stream to fill a 1024×1024 area on a large display device. Also, a receiver may have a smaller display than the size of a video stream. For this case, the video stream should be scaled down to be fully visible on the small display.

In accordance with an embodiment of the invention, upscaling is performed by the receiver, whereas downscaling is performed by the transmitter. One reason for this segregation of scaling duties is that scaled down video data requires lower network bandwidth to transmit. By downscaling video data on its own, the transmitter avoids sending video data that would be later discarded by the receiver. This also permits some simplification of the receiver in that resources, such as software code for downscaling video data, are not needed at the receiver.

Upscaling typically involves duplication of video data. It would be inefficient to send duplicated video data over a network. Therefore, the receiver performs all upscaling operations after receipt of the video data in its smaller form. Upscaling of video data is supported in the fields associated with the video data packet. Specifically, the video protocol provides separate fields for specifying the video source pixel array size and the destination display rectangle size. The amount of horizontal scaling is (width/source_w), and the amount of vertical scaling is (height/source_h).

Upscaling is performed after the video data has been decompressed and transformed into RGB format, though in certain embodiments upscaling may precede, or be combined with, the decompression steps. The receiver expands the video data vertically, horizontally or both as need to make the video data fill the designated display rectangle. Expanding video data may be performed as simply as doubling pixel values, but more advanced image filtering techniques may be used to affect re-sampling of the image for better display quality.

Embodiment of Computer Execution Environment (Hardware)

Figure 8:
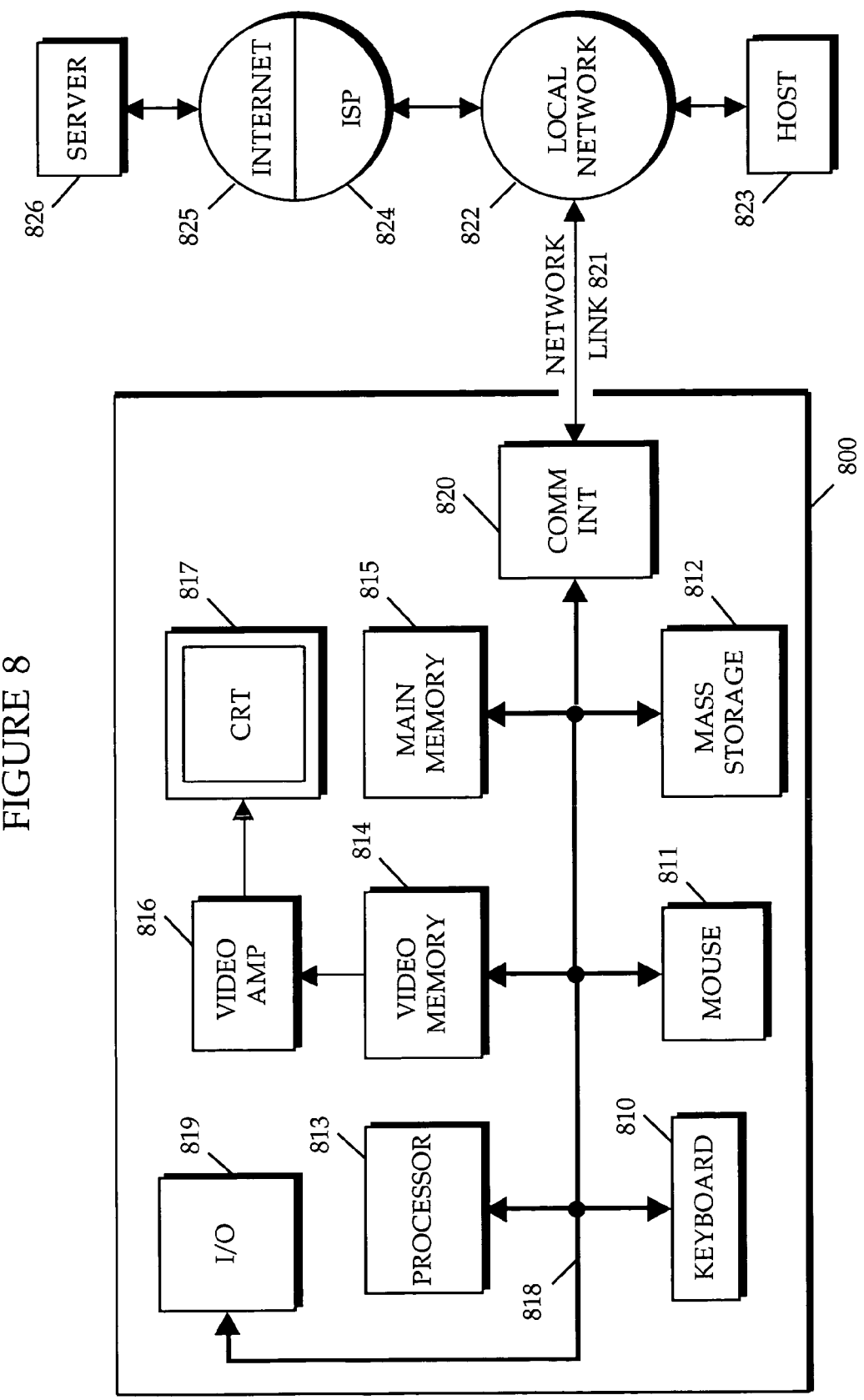
FIG. 8 is a block diagram of a computer execution environment.

An embodiment of the invention can be implemented as computer software in the form of computer readable code executed on a general purpose computer such as computer 800 illustrated in FIG. 8, or in the form of bytecode class files executable within a runtime environment (e.g., the Java runtime environment) running on such a computer. Optionally, a keyboard 810 and mouse (or other pointing device) 811 are coupled directly or indirectly to system bus 818. The keyboard and mouse are for introducing user input to the computer system and communicating that user input to processor 813. Other suitable input devices may be used in addition to, or in place of, the mouse 811 and keyboard 810.

I/O (input/output) unit 819 coupled to system bus 818 represents such I/O elements as a printer, A/V (audio/video) I/O, etc.

Computer 800 includes a video memory 814, main memory 815 and, optionally, mass storage 812, all coupled to system bus 818 along with keyboard 810, mouse 811 and processor 813. The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 64-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a SPARC™ microprocessor from Sun Microsystems™, Inc., or a microprocessor manufactured by Motorola, such as the 680×0 processor or a microprocessor manufactured by Intel, such as the 80×86, or Pentium processor. However, any other suitable microprocessor or microcomputer may be utilized. Main memory 815 is comprised of dynamic random access memory (DRAM). Video memory 814 acts as the frame buffer, and is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images. Alternatively, the video memory could be used to drive a flat panel or liquid crystal display (LCD), or any other suitable data presentation device.

Computer 800 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Communication interface 820 could also be a cable modem or wireless interface. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by an Internet Service Provider (ISP) 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Computer 800 can send messages and receive data, including program code, through the network(s), network link 821, and communication interface 820. In the Internet example, remote server computer 826 might transmit a requested code for an application program through Internet 825, ISP 824, local network 822 and communication interface 820.

The received code may be executed by processor 813 as it is received, and/or stored in mass storage 812, or other non-volatile storage for later execution. In this manner, computer 800 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, and servers on a network.

Human Interface Device Computer System

The invention has application to computer systems where the data is provided through a network. The network can be a local area network, a wide area network, the internet, world wide web, or any other suitable network configuration. One embodiment of the invention is used in a computer system configuration referred to herein as a human interface device computer system.

Figure 9:
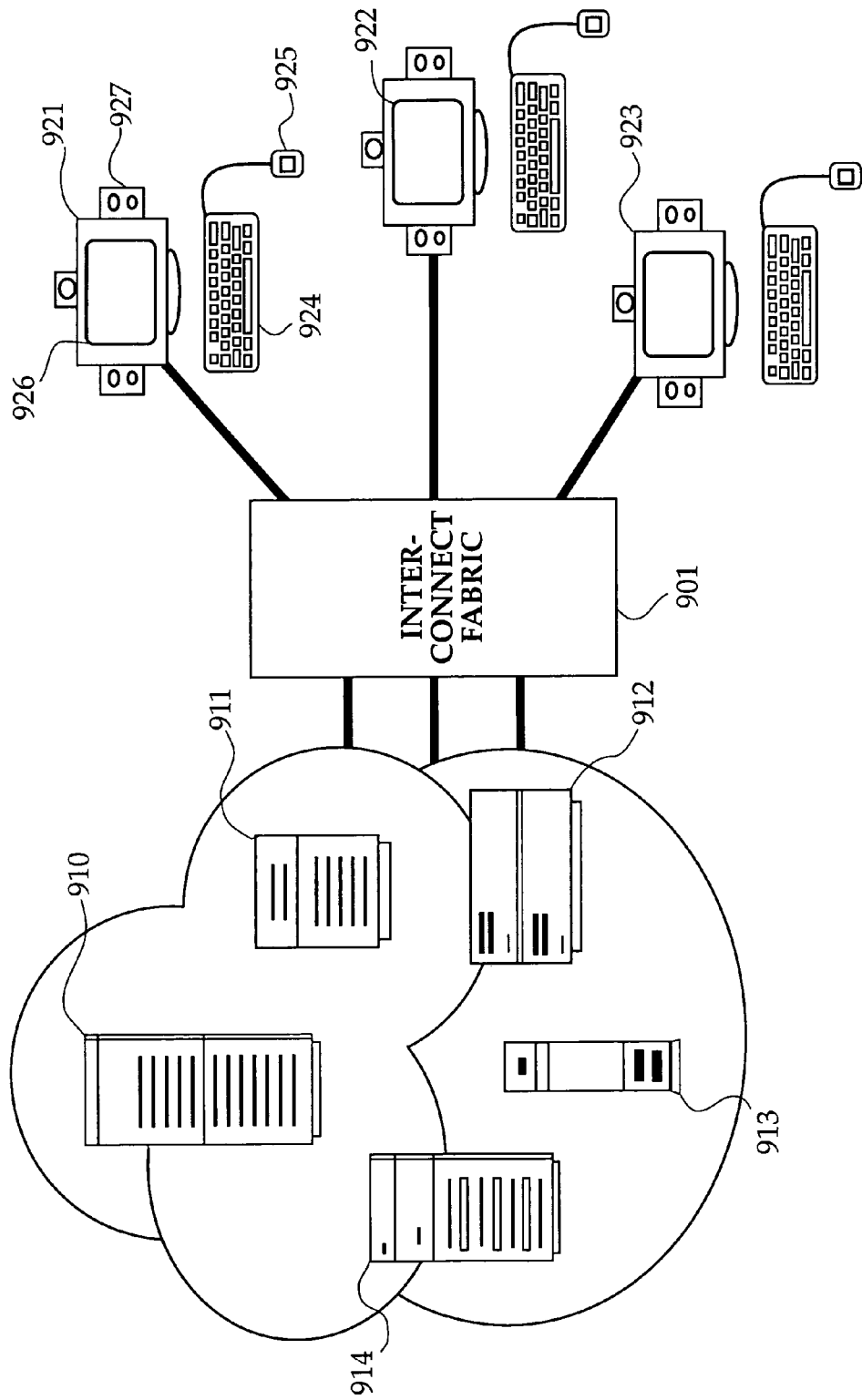
FIG. 9 is a block diagram of a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 9. Referring to FIG. 9, the system consists of computational service providers 900 communicating data through interconnect fabric 901 to HIDs 902.

Computational Service Providers—In the HID system, the computational power and state maintenance is found in the service providers, or services. The services are not tied to a specific computer, but may be distributed over one or more traditional desktop systems such as described in connection with FIG. 8, or with traditional servers. One computer may have one or more services, or a service may be implemented by one or more computers. The service provides computation, state, and data to the HIDs and the service is under the control of a common authority or manager. In FIG. 9, the services are found on computers 910, 911, 912, 913, and 914. In an embodiment of the invention, any of computers 910–914 could be implemented as a transmitter.

Examples of services include X11/Unix services, archived video services, Windows NT service, Java™ program execution service, and others. A service herein is a process that provides output data and responds to user requests and input.

Interconnection Fabric—The interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 9 illustrates HIDs 921, 922, and 923. A HID consists of a display 926, a keyboard 924, mouse 925, and audio speakers 927. The HID includes the electronics need to interface these devices to the interconnection fabric and to transmit to and receive data from the services. In an embodiment of the invention, an HID is implemented as a receiver.

Figure 10:
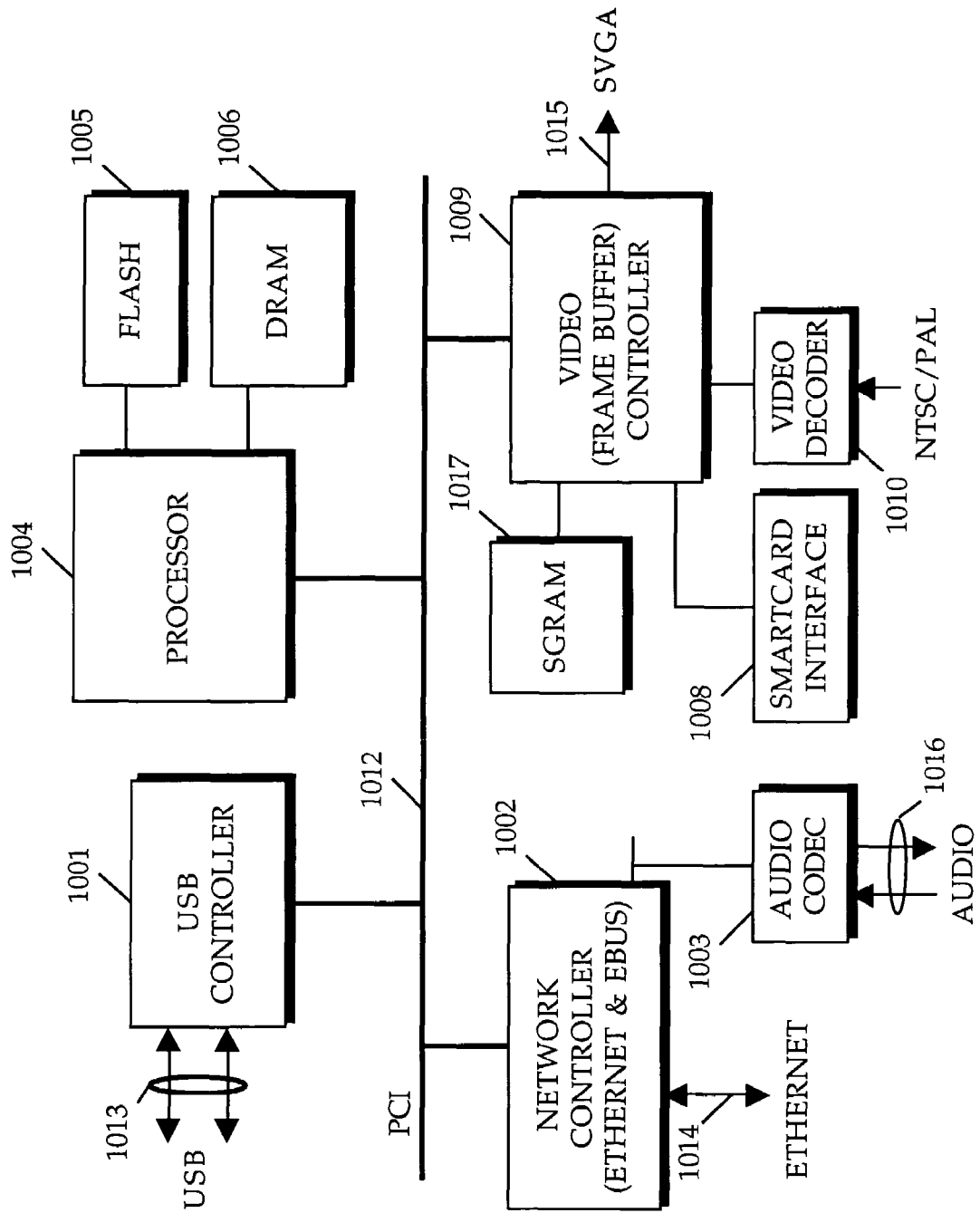
FIG. 10 is a block diagram of an embodiment of a human interface device.

A block diagram of the HID is illustrated in FIG. 10. The components of the HID are coupled internally to a PCI bus 1012. A network control block 1002 communicates to the interconnect fabric, such as an ethernet, through line 1014. An audio codec 1003 receives audio data on interface 1016 and is coupled to block 1002. USB data communication is provided on lines 1013 to USB controller 1001.

The USB controller 1001, network controller 1002 and an embedded processor 1004 are all coupled to the PCI bus 1012. Embedded processor 1004 may be, for example, a Sparc2ep with coupled flash memory 1005 and DRAM 1006. Also coupled to PCI bus 1012 is the video controller 1009 that provides SVGA output on line 1015. The video controller 1009 may be, for example, an ATI RAGE128 frame buffer controller with coupled SGRAM 1017. NTSC or PAL data is provided into the video controller through video decoder 1010. A smartcard interface 1008 may also be coupled to the video controller 1009.

The computer systems described above are for purposes of example only. An embodiment of the invention may be implemented in any type of computer system or programming or processing environment.

Thus, a method and apparatus for clipping video information before scaling have been described in conjunction with one or more specific embodiments. The invention is defined by the claims and their full scope of equivalents.

The invention claimed is:

1. A method comprising:
   obtaining image data on a server, the image data defining a complete image having a horizontal extent and a vertical extent when rendered in a display;
   clipping said image data on said server to obtain clipped image data, the clipped image data representing a portion of the complete image when rendered in the display;
   transmitting said clipped image data from a transmitter on said server via a computer network without conversion to a receiver on a client;
   said receiver scaling said clipped image data for display; and
   said receiver displaying said scaled clipped image data,
   wherein clipping said image data includes obtaining by said server a clip-list specifying at least one clipping rectangle, the at least one clipping rectangle defining a portion of the complete image having the horizontal extent and the vertical extent, and
   wherein clipping said image data includes mapping by said server of said at least one clipping rectangle to said image data to determine said clipped image data, wherein the mapping includes determining for each of two diagonally opposed corner locations of said at least one clipping rectangle one respective nearest pixel in said image data.

2. The method of claim 1, wherein determining a nearest pixel is based on a Euclidean distance.

3. The method of claim 1, wherein said clipped image data are further compressed, wherein said clipped and compressed image data comprises one or more subsampled chroma components and one or more differentiated and quantized luma components, and wherein determining said nearest pixel further comprises:
   determining a plurality of pixels that comprise samples from said one or more subsampled chroma components and values from said one or more differentiated and quantized luma components; and
   determining said nearest pixel from said plurality of pixels.

4. The method of claim 1, wherein said at least one clipping rectangle comprises a plurality of clipping rectangles, and wherein mapping comprises mapping said plurality of clipping rectangles to a plurality of regions of image data.

5. The method of claim 4, wherein transmitting comprises individually transmitting said plurality of clipping rectangles of image data.

6. The method of claim 4, wherein scaling comprises independently scaling up said plurality of regions of image data by said client to fill respective regions of a display.

7. The method of claim 6, wherein said independently scaling said plurality of regions of image data comprises applying independent scale factors that reduce scaling along a horizontal axis and increase scaling along a vertical axis.

8. The method of claim 1, wherein said client is a thin client computer.

9. The method of claim 1, wherein said computer network is a shared network.

10. The method of claim 9, wherein said shared network is a low bandwidth network.

11. The method of claim 9, wherein said computer network is a digital network.

12. A computer readable medium encoded with computer program instructions for processing image data, the computer program instructions comprising:
   program instructions for directing a server to obtain image data, the image data defining a complete image having a horizontal extent and a vertical extent when rendered in a display;
   program instructions for directing said server to clip said image data to obtain clipped image data, the clipped image data representing a portion of the complete image when rendered in the display;
   program instructions for directing said server to transmit said clipped image data via a computer network without conversion to a receiver on a client;
   program instructions for directing said receiver to scale said clipped image data for display; and
   program instructions for directing said receiver to display said clipped image data,
   wherein said program instructions for directing said server to clip said image data includes program instructions for directing said server to obtain a cliplist specifying at least one clipping rectangle, the at least one clipping rectangle defining a portion of the complete image having the horizontal extent and the vertical extent, and program instructions for directing said server to map said at least one clipping rectangle to said image data to determine said clipped image data and to cause said server to determine for each of two diagonally opposed corner locations of said at least one clipping rectangle one respective nearest pixel in said image data.

13. The computer readable medium of claim 12, wherein said program instructions for directing said server to determine a nearest pixel determines a Euclidean distance.

14. The computer readable medium of claim 12, wherein said clipped image data are further compressed, wherein said clipped and compressed image data comprises one or more subsampled chroma components and one or more differentiated and quantized luma components, and wherein said program instructions for directing said server to determine said nearest pixel further comprises:
 program instructions for directing said server to determine a plurality of pixels that comprise samples from said one or more subsampled chroma components and values from said one or more differentiated and quantized luma components; and
 program instructions for directing said server to determine said nearest pixel from said plurality of pixels.

15. The computer readable medium of claim 11, wherein said at least one clipping rectangle comprises a plurality of clipping rectangles, and wherein said program instructions for directing said server to map comprises program instructions for directing said server to map said plurality of clipping rectangles to a plurality of regions of image data.

16. The computer readable medium of claim 15, wherein said program instructions for directing said server to transmit comprises program instructions for directing said server to individually transmit said plurality of regions of image data.

17. The computer readable medium of claim 15, wherein said program instructions for directing said receiver to scale comprises program instructions for directing said receiver to independently scale up said plurality of regions of image data to fill respective regions of a display.

18. The computer readable medium of claim 17, wherein said program instructions for directing said receiver to independently scale said plurality of regions of image data comprises program instructions for directing said receiver to apply independent scale factors that reduce scaling along a horizontal axis and increase scaling along a vertical axis.

19. The computer readable medium of claim 12, wherein said client is a thin client computer.

20. The computer readable medium of claim 12, wherein said computer network is a shared network.

21. The computer readable medium of claim 20, wherein said shared network is a low bandwidth network.

22. The computer readable medium of claim 12, wherein said computer network is a digital network.

23. An apparatus comprising:
 a network;
 a thin client;
 a server configured to obtain image data and perform a mapping of at least one clipping rectangle to said image data to obtain clipped image data, the server configured to perform the mapping by determining for each of two diagonally opposed corner locations of said at least one clipping rectangle one respective nearest pixel in said image data, said server further configured to transmit said clipped image data over said network; and
 a receiver on said thin client configured to receive said clipped image data without conversion over said network, said receiver further configured to scale said clipped image data for display and display said scaled clipped image data.

24. The apparatus of claim 23, wherein said at least one clipping rectangle is defined within a clip-list accessible to said server.

25. The apparatus of claim 23, wherein said server is configured to determine said nearest pixel based upon a Euclidean distance.

26. The apparatus of claim 23, wherein said clipped image data are further compressed, wherein said clipped and compressed image data comprises at least one subsampled chroma component and at least one differentiated and quantized luma components, and wherein said server is configured to determine said nearest pixel from a plurality of pixels that comprise samples from said at least one subsampled chroma component and values from said at least one differentiated and quantized luma component.

27. The apparatus of claim 23, wherein said server is configured to map a plurality of clipping rectangles to a plurality of regions of image data.

28. The apparatus of claim 27, wherein said server is configured to individually transmit said plurality of regions of image data to said receiver.

29. The apparatus of claim 27, wherein said receiver is configured to independently scale up said plurality of regions of image data to fill respective regions of a display.

30. The apparatus of claim 29, wherein said receiver is configured to apply independent scale factors to said regions of image data and wherein said scale factors reduce scaling along a horizontal axis and increase scaling along a vertical axis.

31. The apparatus of claim 23, wherein said network is a shared, low bandwidth network.

32. The apparatus of claim 31, wherein said network is a digital network.

33. The apparatus of claim 23, wherein said thin client provides a network interface to a user and wherein said server provides a plurality of computational services removed from said thin client to said user.

34. The apparatus of claim 33, wherein said plurality of computational services comprise a computational power and a state maintenance for said thin client.

35. The apparatus of claim 23, wherein said image data is clipped only at said server and said clipped image data is scaled only at said thin client in order to provide greater image data transmission efficiency from said server to said thin client via said network.

36. The apparatus of claim 23, further comprising a clip-list identifying visible region displayed on the client, wherein said server is configured to obtain a copy of said clip-list and wherein said copy of said clip-list residing on said server is used by said server to obtain said clipped image data from said obtained image data.

37. An apparatus comprising:
 means on a server for obtaining image data, the image data defining a complete image having a horizontal extent and a vertical extent when rendered in a display;
 means on a server for mapping at least one clipping rectangle to the image data to obtain clipped image data, wherein the mapping includes determining for each of two diagonally opposed corner locations of said at least one clipping rectangle one respective nearest pixel in the image data, wherein the clipped image data represents a portion of the complete image when rendered in the display;

means for transmitting said clipped image data via a computer network from a transmitter on said server without conversion to a receiver on a thin client, wherein said computer network is a shared, low bandwidth network;

means, at said receiver, for scaling said clipped image data for display; and means at said receiver for displaying said clipped image data.

38. The apparatus of claim 37, wherein said computer network is a digital network.

* * * * *